No. 612,092. Patented Oct. 11, 1898.
C. FICKELSCHEER.
MACHINE FOR PRESSING COCOA, TEA, &c.
(Application filed Mar. 17, 1897.)
(No Model.) 2 Sheets—Sheet 1.
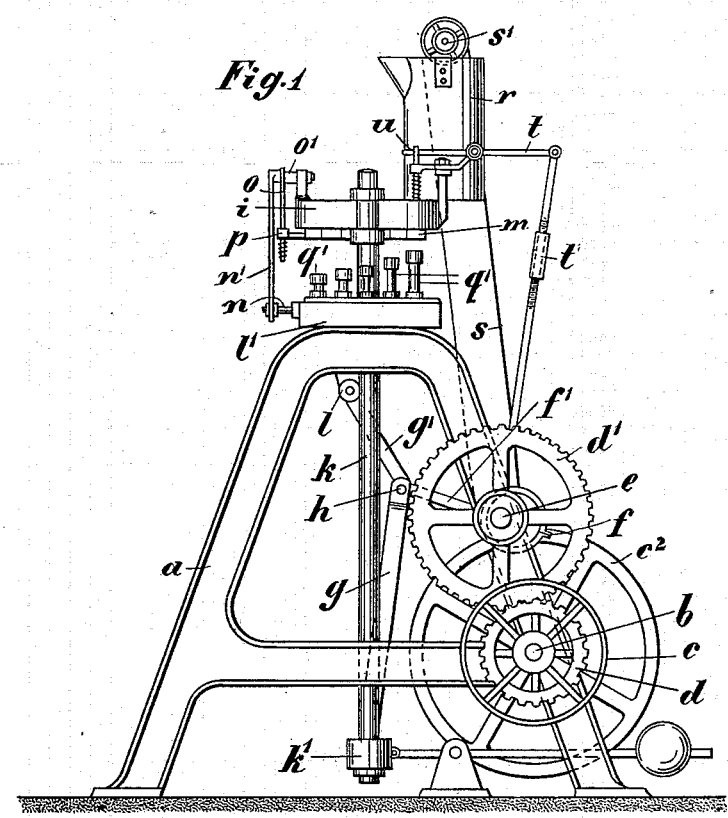
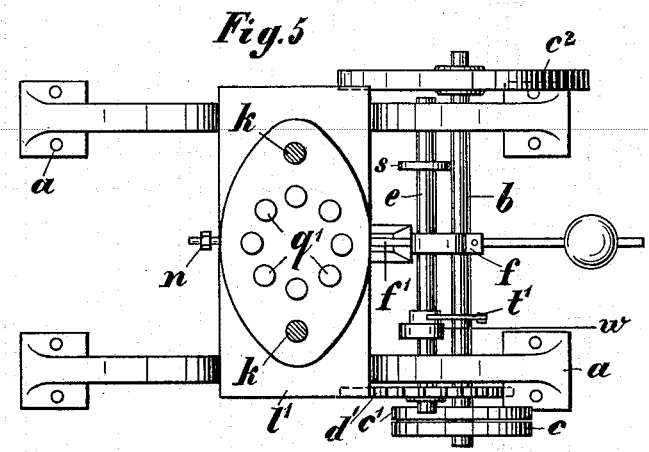
Witnesses
Inventor No. 612,092. Patented Oct. 11, 1898.
C. FICKELSCHEER.
MACHINE FOR PRESSING COCOA, TEA, &c.
(Application filed Mar. 17, 1897.)
(No Model.) 2 Sheets—Sheet 2.
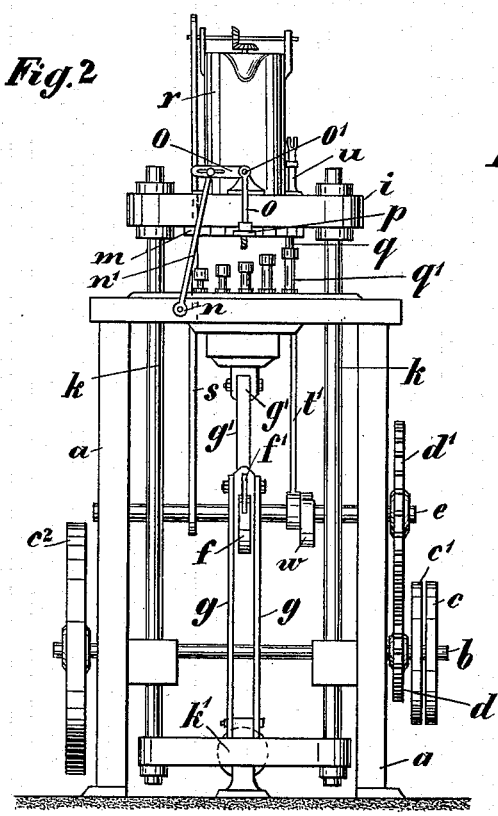
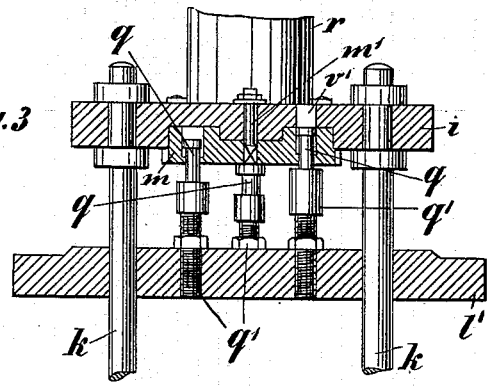
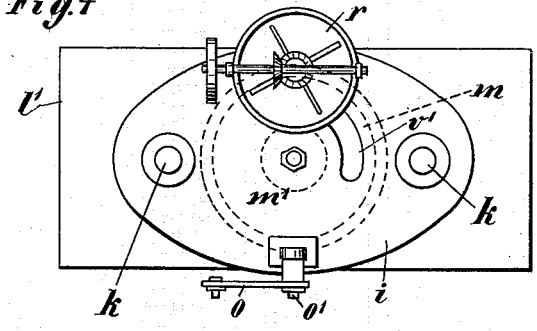
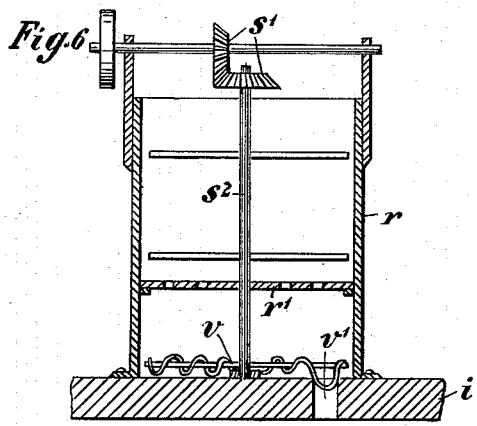
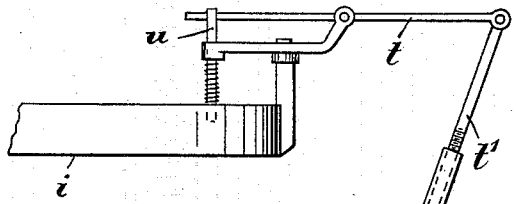
Witnesses
Inventor

UNITED STATES PATENT OFFICE.

CARL FICKELSCHEER, OF CASSEL, GERMANY.

MACHINE FOR PRESSING COCOA, TEA, &c.

SPECIFICATION forming part of Letters Patent No. 612,092, dated October 11, 1898.

Application filed March 17, 1897. Serial No. 628,034. (No model.) Patented in Austria June 26, 1896, No. 3,358.

*To all whom it may concern:*

Be it known that I, CARL FICKELSCHEER, manufacturer, of 6 Töpfermarkt, Cassel, in the Province of Hesse-Nassau, Kingdom of Prussia, Germany, have invented new and useful Improvements in Machines for Pressing Cocoa and the Like, (patented in Austria June 26, 1896, No. 3,358,) of which the following is a specification.

This invention relates to a machine for pressing and shaping dry or moist substances—such as cocoa, tea, coffee, succedaneum, and the like—in which the substances to be pressed are introduced into the molds and after being pressed by the pressing stamps or plungers at pressures which are increased by steps or stages are finally pressed out of such molds by the said stamps or plungers.

The accompanying drawings illustrate a machine constructed in accordance with the invention.

Figure 1 is a side view; Fig. 2, a front view; Fig. 3, the upper part of the machine with press or mold cylinder or plate drawn to a larger scale; Fig. 4, a plan view of Fig. 3; Fig. 5, a plan view of Fig. 1, the upper part being removed; Fig. 6, the mold-filling apparatus; Fig. 7, the apparatus for pressing back the pressing-plungers.

In the lower part of the frame $a$ is arranged the driving-shaft $b$, which is furnished at one end with fast and loose pulleys $c$ $c'$ and at the other end with a fly-wheel $c^2$. The toothed wheel $d$, fixed on this shaft $b$, gears with a toothed wheel $d'$ of a shaft $e$. The eccentric $f$ is connected with the toggle-links $g$ and $g'$ by means of the eccentric-rod $f'$ and the pin $h$ for the purpose of effecting the upward and downward movements of the press-head $i$. This latter is supported by columns or pillars $k$, the lower ends of which are connected with a cross-head $k'$, operated by the toggle-link $g$, composed of two bars, as shown in Fig. 2, while the toggle-link $g'$ is connected with a bracket $l$ of a plate $l'$, resting on the frame $a$.

In the press-head $i$ is placed the mold cylinder or plate $m$, so as to rotate round the pin $m'$. At each upward movement of the press-head $i$ this mold-plate $m$ is rotated to a certain extent. This is effected as follows: When the press-head $i$ moves up and down, a bell-crank lever $o$, which is pivoted on the fulcrum-pin $o'$, fixed to the press-head $i$, is moved by a rod $n'$, pivoted at $n$ to the fixed plate $l'$. At the lower end of the vertical arm of the bell-crank lever $o$ is pivoted a ratchet-pawl $p$, which is pressed by means of a spiral spring against ratchet-teeth formed on the periphery of the mold-plate $m$, so that each upward movement of the press-head $i$ effects a corresponding rotation of the mold-plate.

In the mold-plate $m$ is arranged a number of pressing stamps or plungers $q$, which are free to move up and down in the molds, but cannot fall out. These pressing-plungers after every rotatory movement of the mold-plate—that is to say, after the upward movement of the press-head $i$—come to bear on the upper ends of the pins or studs $q'$, which are of different lengths and are screwed into the fixed plate $l'$, so that when the press-head $i$ moves downward it effects a pressing together of the substances present in the molds formed by the recesses of the mold-plate and the upper ends of the pressing-plungers, the said substances being pressed by the pressing-plungers against the lower surface of the press-head $i$. When the press-head $i$ is raised again, the mold-plate $m$ receives another partial rotatory motion, so that the pressing-plungers $q$ take up fresh positions with reference to the pins or studs $q'$; and when the press-head $i$ again descends it imparts a further pressure to the substance contained in the molds corresponding to the lengths of the pins or studs $q'$, until finally the substance which has been sufficiently pressed by the successive pressing operations is pushed out by means of the pressing-plunger through an aperture in the press-head $i$, corresponding to that one of the molds of the mold-plate in which the final pressure has been administered. It may, however, be remarked that the amount by which the mold-plate $m$ is rotated each time must agree exactly with the distances of the pins or studs $q'$ from one another, so that each mold is brought each time it is moved over a pin $q$, the top of which stands higher above the plate $l'$ than that of the preceding one. The number of ratchet-teeth on the mold-plate $m$ must also agree with the number of stamping-plungers $q$ and pins or studs $q'$. These pins or studs are provided, respectively, with a screw-threaded shank by means of which they may be secured to the plate $l'$ and a check-nut, by means of which construction said pin may be so adjusted as to increase or diminish the pressure exerted by each of said pins or studs.

The receiver $r$ serves for the reception of the substances to be pressed and is divided into an upper and a lower part by means of a sieve $r'$. In this receiver is arranged a stirring mechanism worked in the following manner: From the shaft $e$ an elastic pulley-band $s$ gives motion by means of two bevel-wheels $s'$ to the vertical shaft $s^2$, which is provided with arms for effecting the stirring. At the lower end of the shaft $s^2$ is a stirrer $v$, which is provided with a helical spring. This spring in passing the filling-hole $v'$ secures complete filling of the pressing-molds by springing as it passes into the said hole, as shown in Fig. 6.

In order that the pressing-plunger $q$, which has effected the forcing out of the cake, may be pressed back again automatically after the contents of each separate mold have been pressed and forced out through the press-head, a two-armed lever $t$ is attached to the press-head $i$, Fig. 7. One end of this lever is in connection with the adjustable rod $t'$, the lower end of which is formed as a fork that takes over the shaft $e$. The other end of the two-armed lever $t$ rests in the forked end of the pin $u$, which is pressed upward by means of a spring. Close to the fork of the rod $v'$ is a tappet $w$, secured on the shaft $e$. At each rotation of the shaft $e$ this tappet comes against the roller $w'$, situated immediately over the fork, and operates the rod $t'$, lever $t$, and pin $u$, so as to press the plunger $q$ out of the hole $v'$ and down into its mold in the mold-plate $m$ free of the press-head $i$.

After the receiver $r$ is filled with the substance to be pressed and the machine is set in motion the substance in the upper part of the receiver is pressed through the sieve $r'$ by the stirring-arms into the lower part of the receiver $r$, and thence through the filling-hole $v'$ in the press-head, into each in succession of the molds of the mold-plate $m$, the completion of the filling being effected by means of the helical spring on the stirring-arm $v$. As the machine continues its motion every upward movement of the press-head $i$ causes the mold-plate $m$ to be rotated to the extent of one tooth of the ratchet—that is to say, to an extent corresponding to the distance between two molds—and at every downward movement of the press-head $i$ a mold is filled and a plunger $q$ pressed downward by the pin $u$ after it has pushed out the completely-pressed cake of material, and pressure is administered to the substance in each mold. These processes are repeated at each rotation of the shaft $e$, all that is necessary being to keep the receiver $r$ filled with the substance to be pressed.

It will be understood that by means of the adjustable pins or studs $q'$ the pressure can be regulated to suit the substance to be pressed.

Having now described my invention, what I claim, and desire to secure by Letters Patent, is—

1. In a machine for pressing dry or moist substances, the combination with a vertically-movable platen, of a mold-plate carried thereby, means for intermittently rotating the same, a pressing-plunger seated permanently in each mold, pins or studs successively of increased heights situated in the paths of said plungers, whereby said plungers are caused to exert an increased pressure at each rotation of said mold-plate, and means whereby said platen is moved vertically, substantially as described.

2. In a machine for pressing dry or moist substances, the combination with a vertically-movable platen, of a mold-plate carried thereby, means for intermittently rotating the same, a pressing-plunger seated permanently in each mold, adjustable pins or studs successively of increased heights situated in the paths of said plungers, whereby said plungers are caused to exert an increased pressure at each rotation of said mold-plate, and means whereby said platen is moved vertically, substantially as described.

3. In a machine for pressing dry or moist substances, the combination with a frame and a vertically-movable platen, of a mold-plate carried thereby, ratchet-teeth thereon, a bell-crank pivotally connected with said platen, a pivotal connection between one arm of said bell-crank, and said frame, a pawl supported by the other arm of said crank, means whereby said pawl is held in contact with said ratchet-teeth, a pressing-plunger seated permanently in each mold, pins or studs successively of increased heights situated in the paths of said plungers, whereby said plungers are caused to exert an increased pressure at each rotation of said mold-plate, and means whereby said platen is moved vertically, substantially as described.

4. In a machine for pressing dry or moist substances, the combination with a vertically-movable platen, of a mold-plate carried thereby, means for intermittently rotating the same, a pressing-plunger seated permanently in each mold, pins or studs successively of increased heights situated in the paths of said plungers, whereby said plungers are caused to exert an increased pressure at each rotation of said mold-plate, and means whereby the plungers are restored to their seats in the molds after the ejection of a completely-pressed cake of the substance being operated upon, substantially as described.

5. In a machine for pressing dry or moist substances, the combination with a frame, a power-shaft journaled therein, means for communicating power to said shaft, a vertically-movable platen, and means whereby in conjunction with said shaft, said platen is moved vertically, of a mold-plate carried thereby, a pressing-plunger seated permanently in each mold, pins or studs situated in the paths of said plungers, whereby pressure is exerted upon said pressing-plunger, means for intermittently rotating said mold-plate, a lever fulcrumed on said platen, means whereby said lever is oscillated, a pin operated upon by said lever, whereby each pressing-plunger is restored to its seat in the mold-plate, after the ejection of a completely-pressed cake of the substance being operated upon, substantially as described.

6. In a machine for pressing dry or moist substances, the combination with a frame, a power-shaft journaled therein, means for communicating power to said shaft, a vertically-movable platen, and means whereby in conjunction with said shaft, said platen is moved vertically, of a mold-plate carried thereby, a pressing-plunger seated permanently in each mold, pins or studs situated in the paths of said plungers, whereby pressure is exerted upon said pressing-plunger, means for intermittently rotating said mold-plate, an arm supported by said platen, a lever fulcrumed on said arm, a pin supported by said arm and operated upon by said lever, a spring whereby said pin is normally held, so as not to interfere with the rotation of said mold-plate, and means whereby said lever is oscillated to restore each pressing-plunger to its seat in the mold-plate after the ejection of a completely-pressed cake of the substance being operated upon, substantially as described.

7. In a machine for pressing dry or moist substances, the combination with a frame, a power-shaft journaled therein, means for communicating power to said shaft, a vertically-movable platen, and means whereby in conjunction with said shaft, said platen is moved vertically, of a mold-plate carried thereby, a pressing-plunger seated permanently in each mold, pins or studs situated in the paths of said plungers, whereby pressure is exerted upon said pressing-plunger, means for intermittently rotating said mold-plate, an arm supported by said platen, a lever fulcrumed on said arm, a pin supported by said arm and operated upon by said lever, a spring whereby said pin is normally held so as not to interfere with the rotation of said mold-plate, a tappet mounted on said power-shaft, a forked rod, the ends of which respectively inclose said shaft and have a pivotal connection with said lever and a pin on said rod whereby said lever is oscillated to restore each pressing-plunger to its seat in the mold-plate after the ejection of a completely-pressed cake of the substance being operated upon, substantially as described.

8. In a machine for pressing dry or moist substances, the combination with a frame, a power-shaft journaled therein, means for communicating power to said shaft, a vertically-movable platen and means whereby, in conjunction with said shaft, said platen is moved vertically, of a mold-plate carried thereby, a pressing-plunger seated permanently in each mold, pins or studs situated in the paths of said plungers, whereby pressure is exerted upon said pressing-plunger, means for intermittently rotating said mold-plate, an arm supported by said platen, a lever fulcrumed on said arm, a pin supported by said arm and operated upon by said lever, a spring whereby said pin is normally held so as not to interfere with the rotation of said mold-plate, a tappet mounted on said power-shaft, an adjustable forked rod, the ends of which respectively inclose said shaft and have a pivoted connection with said lever and a pin on said rod whereby said lever is oscillated to restore each pressing-plunger to its seat in the mold-plate after the ejection of a completely-pressed cake of the substance being operated upon, substantially as described.

9. In a machine for pressing dry or moist substances, the combination with a vertically-movable platen, and means whereby said platen is moved vertically, of a mold-plate carried thereby, means whereby said mold-plate is intermittently rotated, a plunger seated permanently in each mold, pins or studs situated in the paths of said plungers, whereby said plungers are actuated to compress the matter within the molds, a receiver, and means whereby part of the contents of said receiver may be pressed into the mold after the pressed cake has been ejected therefrom, substantially as described.

10. In a machine for pressing dry or moist substances, a mold-plate and molds a receiver comprising a casing communicating with said molds, a transverse-perforated partition, a central shaft, agitators mounted thereon means for actuating said agitators, and means whereby the contents of said receiver are transmitted to the molds, substantially as described.

11. In a machine for pressing dry or moist substances, the combination with a frame, a power-shaft journaled therein, means whereby power is transmitted to said shaft, a pulley on said shaft, a vertically-movable platen, means in conjunction with said shaft whereby said platen is moved vertically, and a mold-plate carried thereby, of a receiver mounted on said platen comprising a casing, a central shaft, agitators mounted thereon, a transverse shaft, intermeshing cog-wheels on said shafts respectively, a pulley on said transverse shaft, an elastic belt between said pulleys of the frame-shaft and transverse shaft of the receiver whereby said agitators are actuated, and means whereby the contents of said receivers are transmitted to the molds, substantially as described.

12. In a machine for pressing dry or moist substances, the combination with a frame, of a plate mounted thereon, a platen, a power-shaft, a cross-head, pillars or columns connecting said cross-head and said platen, toggle-links connected with said plate and said cross-head, a link whereby in connection with said power-shaft, said toggle-links are actuated, a mold-plate supported by said platen, means whereby said plate is intermittently rotated, a plunger seated permanently in each mold, adjustable pins or studs of increasing height supported by said first-named plate, whereby in conjunction with said plunger, the pressure exerted by each plunger is increased, means whereby said plungers are restored to their normal positions after the matter being pressed has been ejected from the mold, and means for transmitting power to said power-shaft, substantially as described.

In testimony that I claim the foregoing as my invention I have signed my name in presence of two subscribing witnesses.

CARL FICKELSCHEER. [L. S.]

Witnesses:
HERMANN BUANN,
AUGUST THEIR.